E. A. JOHNSTON.
POWER TRANSMISSION MECHANISM.
APPLICATION FILED APR. 18, 1912.
1,144,547.
Patented June 29, 1915.
3 SHEETS—SHEET 1.
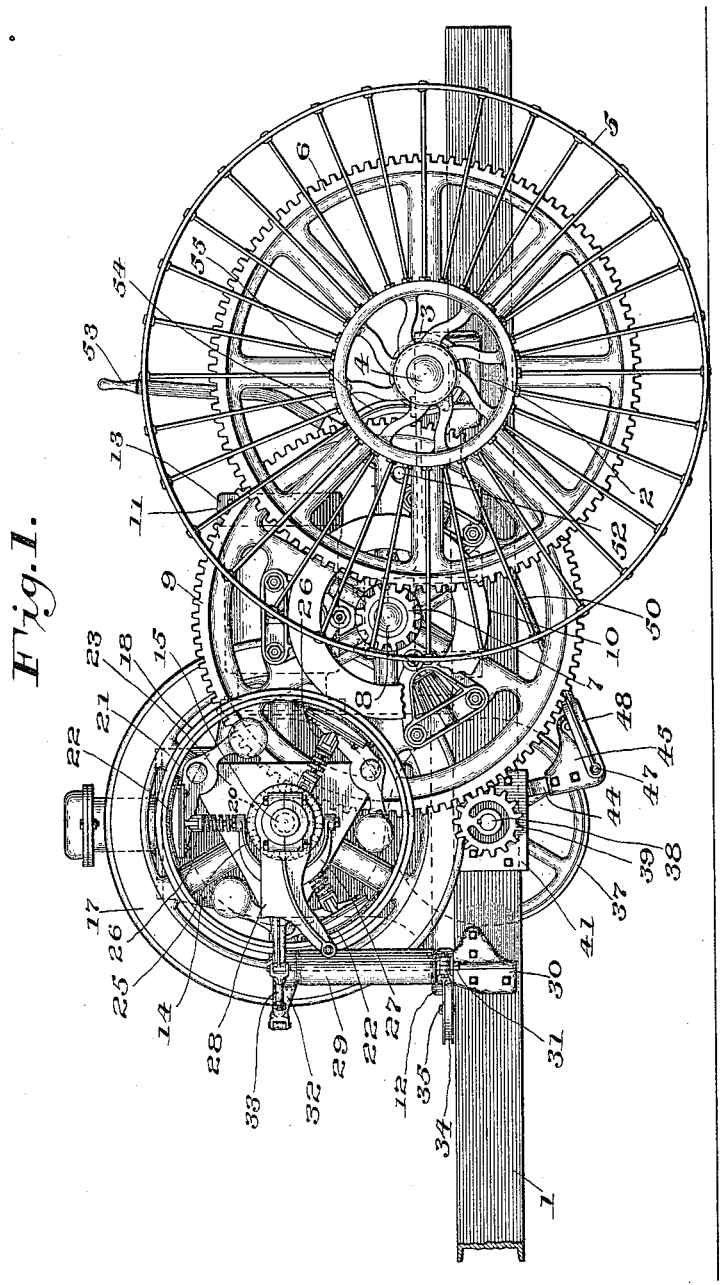
Witnesses:
C. C. Palmer
F.W. Hoffmeister
Inventor:
Edward A. Johnston
By O.W. Burgess
Attorney.

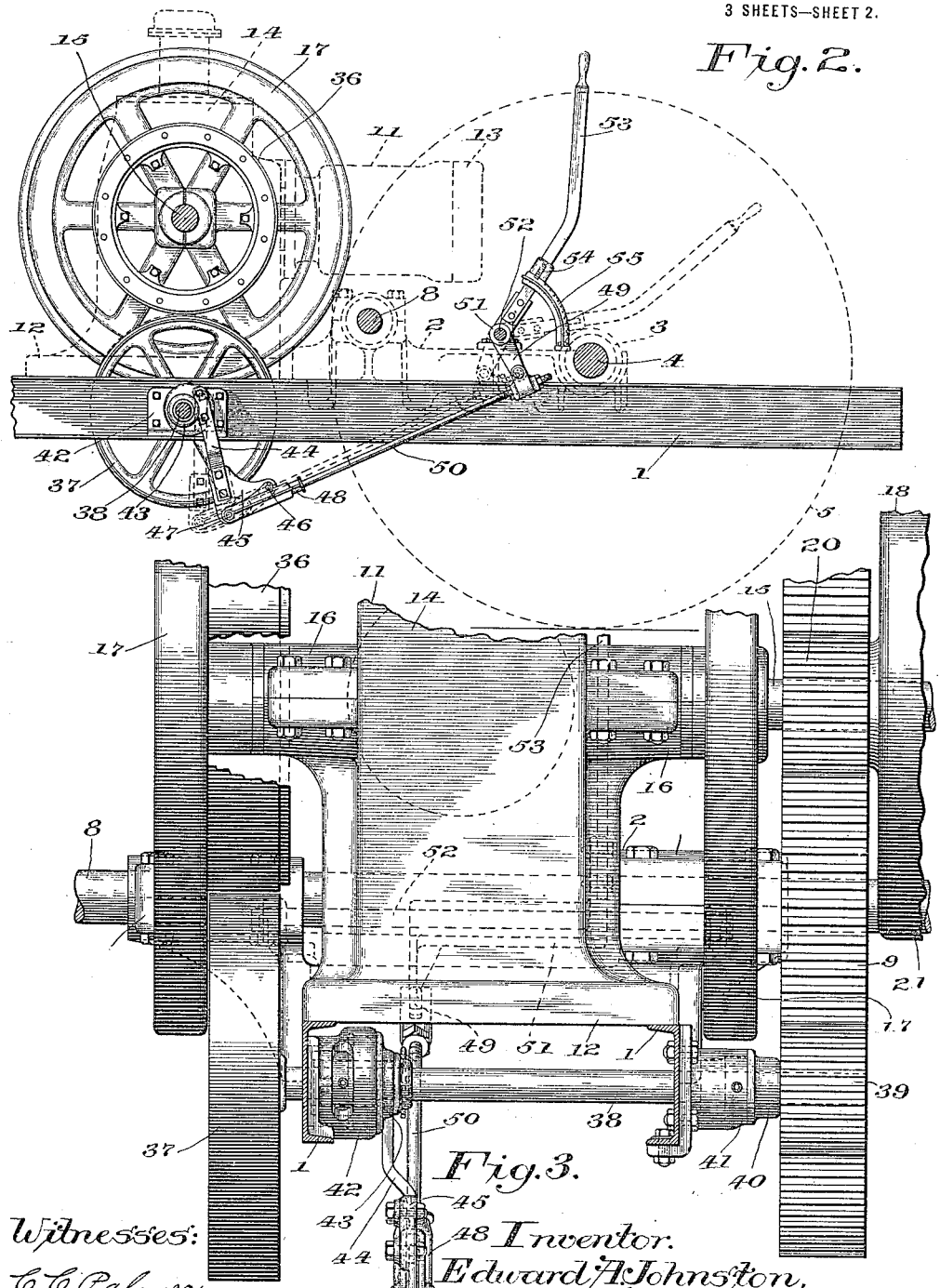

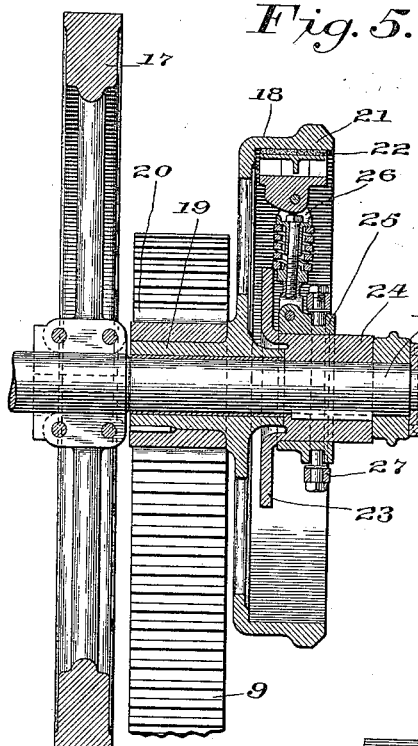
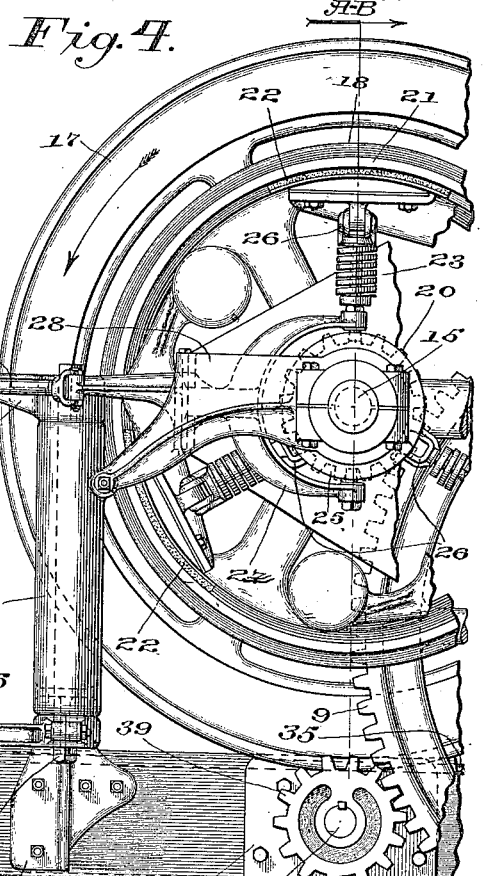

UNITED STATES PATENT OFFICE.

EDWARD A. JOHNSTON, OF CHICAGO, ILLINOIS, ASSIGNOR, BY MESNE ASSIGNMENTS, TO INTERNATIONAL HARVESTER CORPORATION, A CORPORATION OF NEW JERSEY.

POWER-TRANSMISSION MECHANISM.

1,144,547.  Specification of Letters Patent.  Patented June 29, 1915.

Application filed April 18, 1912. Serial No. 691,735.

*To all whom it may concern:*

Be it known that I, EDWARD A. JOHNSTON, a citizen of the United States, residing at Chicago, in the county of Cook and State of Illinois, have invented certain new and useful Improvements in Power-Transmission Mechanism, of which the following is a specification.

My invention is adapted in particular for use in connection with traction engines wherein the source of power is an internal combustion engine running in one direction only; the object of my invention being to provide improved means for reversing the direction of travel of the tractor. I attain this object by means of the mechanism illustrated by the accompanying drawings, in which—

Figure 1 represents a side elevation of part of a traction engine having my invention forming a part thereof; Fig. 2 is a side elevation of part of Fig. 1 as viewed from the opposite side of the mechanism. Fig. 3 is a front end elevation of Fig. 2, partly in section, on an enlarged scale and designed to illustrate the construction and manner of mounting the reverse motion mechanism; Fig. 4 represents a part of Fig. 1 and illustrates the operation of the clutch mechanism; Fig. 5 represents a vertical section of Fig. 4 along line A—B; Fig. 6 is an end elevation of one of the bearing brackets in which is supported one end of the reverse motion power transmitting shaft and designed to receive an eccentric sleeve in which the shaft may be journaled; Fig. 7 is a vertical sectional side elevation of Fig. 6 along line A—B; Fig. 8 is a longitudinal section of Fig. 6 along line C—D; Fig. 9 is an end elevation of an eccentric bearing sleeve adapted to be received by the bracket member shown in Fig. 6; Fig. 10 is a side elevation of Fig. 9; Fig. 11 is a longitudinal section of Fig. 10 along line A—B; Fig. 12 represents a side elevation of a bracket member that forms part of the reverse motion mechanism; Fig. 13 represents an end elevation of a bracket member designed to carry the opposite end of the reverse motion power transmitting shaft; Fig. 14 represents a vertical longitudinal section of Fig. 13 along line C—D; Fig. 15 is an end elevation of a bearing box designed to be received by the bracket member shown in Fig. 13; and Fig. 16 represents a vertical longitudinal half section of Fig. 15.

The same reference characters designate like parts throughout the several views.

1 represents longitudinally arranged truck frame members upon opposite sides of the machine, 2 the bed frame member secured to the truck frame members and having bearing boxes 3 carried thereby, in which is journaled the main axle 4, having traction wheels 5 upon opposite ends thereof, the traction wheels having the gear members 6 secured thereto and engaging with pinions 7 secured to opposite ends of a transversely arranged shaft 8 journaled in bearings carried by the bed frame member 2.

9 represents a large spur gear member carried by shaft 8 and connected therewith by means of a common form of differential gear mechanism 10.

11 represents an internal combustion engine including a base member 12 whereby the engine is secured to the truck frame members 1, a power cylinder 13, a crank case 14 and engine crank shaft 15 journaled in bearings 16 carried by the crank case and having fly wheels 17 secured to opposite ends thereof.

18 represents a loose clutch member journaled upon one end of the crank shaft, having a sleeve portion 19 to which is keyed a pinion 20 that meshes with the large spur gear member 9, and an internal laterally projecting rim portion 21 that is adapted to frictionally engage with radially movable clutch shoe members 22 that are carried by a fixed clutch member 23 keyed to the engine crank shaft and having a sleeve portion 24, upon which is slidably mounted a clutch shipping ring 25 that is operatively connected with the shoe members 22 by means of yielding toggle members 26 in a well-known way.

27 represents a clutch shipping fork having a vertical pivotal connection with a bracket member 28, having one end supported by the crank shaft of the engine and the opposite end thereof by means of a vertically arranged sleeve member 29, the lower end of the sleeve being provided with a bracket portion 30 whereby it is secured to a fixed part of the truck frame.

31 represents a rock shaft journaled in the sleeve 29, having secured to the upper end thereof a lever arm 32 that is operatively connected with the clutch shipping fork 27 by means of a link 33 that is adjustable lengthwise, and 34 represents a lever arm secured to the lower end of said shaft and that may be operatively connected with a hand lever by means of a rod 35.

When the pinion 20 is caused to rotate with the power shaft of the engine by means of the clutch mechanism, the tractor is driven in a forward direction.

Secured to the fly wheel upon the opposite end of the engine crank shaft is a friction wheel 36 that is adapted to engage with a friction wheel 37 secured to one end of a reverse motion power transmitting shaft 38, having a pinion 39 secured to the opposite end thereof and engaging with the spur gear member 9, the end of the shaft carrying the pinion being journaled in a relatively fixed bearing including a sleeve 40 that is received by an opening in a bracket member 41 secured to one of the truck frame members 1. The opposite end of the shaft, to which is secured the friction wheel 37, is journaled in a movable bearing including a bracket member 42 having an opening therein that receives a sleeve 43, in which the shaft 38 is journaled, the bearing portion of the sleeve received by the bracket being arranged eccentric to the axis of the shaft whereby a turning movement of the sleeve 43 relative to the bracket will cause the shaft and wheel 37 to move toward or from friction wheel 36. The means for controlling the angular movement of the sleeve includes a bar 44, having one end secured to the sleeve and the opposite end thereof to a sector member 45 provided with a series of lateral openings 46 spaced apart in a fore and aft direction, that may selectively receive a pin 47 whereby the sector member is pivotally connected with one end of a yoke member 48, the opposite end of the yoke being connected to an arm 49 by means of a rod 50, the arm being integral with one end of a sleeve 51 mounted upon a transverse shaft 52 journaled in bearings carried by the bed frame member 2, and secured to the opposite end of the sleeve is a hand lever 53 provided with a common form of spring-pressed detent 54 that engages with the toothed sector 55 in a manner to retain the lever in any desired position of adjustment.

In operation, if it be desired to move the tractor in a forward direction the clutch mechanism is shipped into action. A reverse motion is given by moving the hand lever rearward, as shown by dotted lines in Fig. 2, the clutch mechanism having been previously thrown out of operation.

What I claim as my invention, and desire to secure by Letters Patent, is:

1. A power transmitting gear mechanism for use in connection with traction engines having, in combination, an engine crank shaft, a secondary power transmitting shaft arranged parallel with said engine shaft, a spur gear member secured to said secondary shaft, a pinion carried by said engine shaft and engaging with said spur gear in a manner to cause said gear member to rotate in one direction, a reverse motion mechanism including a friction wheel carried by said engine shaft, a reverse motion shaft arranged parallel with said engine shaft and in substantially the same vertical plane, a pinion secured to one end of said reverse motion shaft and engaging with said spur gear member, a friction wheel carried by the opposite end of said reverse motion shaft, and means for moving the end of said shaft carrying the said friction wheel toward or from said engine shaft.

2. A power transmitting gear mechanism for use in connection with traction engines having, in combination, an engine crank shaft, a secondary power transmitting shaft arranged parallel with said engine shaft, a spur gear member secured to said secondary shaft, a pinion carried by said engine shaft and engaging with said spur gear member in a manner to cause said gear member to rotate in one direction, a reverse motion mechanism including a friction wheel carried by said engine shaft, a reverse motion shaft arranged parallel with said engine shaft and in substantially the same vertical plane, a pinion secured to one end of said reverse motion shaft and engaging with said spur gear member, a friction wheel carried by the opposite end of said reverse motion shaft, said shaft being journaled in a relatively fixed bearing at the end thereof carrying said pinion and in a movable bearing including an eccentric sleeve at the opposite end thereof, and means for adjusting said sleeve angularly in a manner to cause said friction wheel to move toward or from said engine shaft.

3. A power transmitting gear mechanism for use in connection with traction engines having, in combination, an engine crank shaft, a secondary power transmitting shaft arranged parallel with said engine shaft, a spur gear member secured to said secondary shaft, a pinion carried by one end of said engine shaft and engaging with said spur gear in a manner to cause said gear member to rotate in one direction, a reverse motion mechanism including a friction wheel carried by the opposite end of said engine shaft, a reverse motion shaft arranged parallel with said engine shaft and in substantially the same vertical plane, a pinion secured to one end of said reverse motion shaft and engaging with said spur gear member, a friction wheel carried by the opposite end of said reverse motion shaft, said shaft being journaled in a relatively fixed bearing at the end thereof carrying said pinion and in a movable bearing including an eccentric sleeve at the opposite end thereof, a lever arm having one end thereof secured to said sleeve, a link connection between the opposite end of said lever arm and a hand lever mounted upon the machine whereby said sleeve may be given angular motion in a manner to move said friction wheel toward or from said engine shaft.

4. In power transmitting gear mechanism, the combination of a crank shaft, a second shaft, intermeshing gears on said shafts, means for controlling the transmission of power through said shafts, a friction wheel mounted on said crank shaft, a third shaft, a gear thereon meshing with a gear on said second shaft, and a friction wheel on said third shaft for engaging and disengaging said other friction wheel for transmission purposes.

5. In power transmitting gear mechanism, the combination of drive and driven shafts, means whereby motion is transmitted from one to another, a friction wheel on said drive shaft, a third shaft adapted to be moved laterally, and means on said third shaft including another friction wheel for engaging the first transmit motion from said drive to said driven through said third shaft.

6. In power transmitting gear mechanism, the combination of a driven shaft, and means for driving said shaft in different directions including a shaft capable of lateral movement, coöperating friction wheels one of which is mounted on said last mentioned shaft, and eccentric means for moving said last mentioned shaft at one end only to cause engagement and disengagement of said friction wheels.

EDWARD A. JOHNSTON.

Witnesses:
A. L. CROOKS,
LEO J. FORSTER.

Copies of this patent may be obtained for five cents each, by addressing the "Commissioner of Patents, Washington, D. C."